United States Patent
Nastri

(10) Patent No.: US 7,661,719 B1
(45) Date of Patent: Feb. 16, 2010

(54) POOL VACUUM PORT

(76) Inventor: Vincenzo A. Nastri, 81386 Avenida Blanca, Indio, CA (US) 92201

( * ) Notice: Subject to any disclaimer, the term of this patent is extended or adjusted under 35 U.S.C. 154(b) by 222 days.

(21) Appl. No.: 11/752,003

(22) Filed: May 22, 2007

(51) Int. Cl.
*F16L 3/04* (2006.01)
*F16L 41/00* (2006.01)

(52) U.S. Cl. ............... 285/143.1; 285/129.1; 4/507

(58) Field of Classification Search ......... 285/129.1, 285/142.1, 141.1, 143.1, 129.2, 136.1, 924, 285/7, 130.1; 4/507
See application file for complete search history.

(56) References Cited

U.S. PATENT DOCUMENTS

| | | | |
|---|---|---|---|
| 1,781,985 A * | 11/1930 | Le Grand | 220/256.1 |
| 3,940,807 A | 3/1976 | Baker et al. | |
| 4,127,485 A | 11/1978 | Baker et al. | |
| 4,262,371 A | 4/1981 | Berry et al. | |
| 4,359,790 A | 11/1982 | Chalberg | |
| 4,402,094 A | 9/1983 | Sanders | |
| 4,402,420 A | 9/1983 | Chernack | |
| 4,501,659 A | 2/1985 | Henk | |
| 4,596,656 A | 6/1986 | Higginbotham et al. | |
| 4,620,729 A * | 11/1986 | Kauffman | 285/136.1 |
| 4,817,991 A * | 4/1989 | Frentzel et al. | 285/7 |
| D319,295 S | 8/1991 | Ohaus | |
| 5,115,943 A * | 5/1992 | Coleman | 222/94 |
| 5,249,324 A | 10/1993 | Giammanco et al. | |
| 5,253,374 A | 10/1993 | Langill | |
| 5,427,263 A * | 6/1995 | Bowles | 220/86.2 |
| 5,606,750 A * | 3/1997 | Vos | 4/512 |
| 5,799,339 A | 9/1998 | Perry et al. | |
| 5,809,587 A | 9/1998 | Fleischer | |
| 5,864,896 A | 2/1999 | Ferraro | |
| 6,066,253 A | 5/2000 | Idland et al. | |
| RE36,913 E | 10/2000 | Ferraro | |
| 6,395,167 B1 | 5/2002 | Mattson, Jr. et al. | |
| 6,760,931 B1 * | 7/2004 | Mattson et al. | 4/541.1 |
| 6,811,687 B2 | 11/2004 | Illingworth | |
| 6,939,463 B2 * | 9/2005 | Leaverton | 210/167.12 |
| 2005/0183199 A1 * | 8/2005 | Mattson et al. | 4/541.1 |
| 2005/0278847 A1 * | 12/2005 | Mayer | 4/679 |
| 2005/0283902 A1 * | 12/2005 | Mattson et al. | 4/541.1 |

* cited by examiner

*Primary Examiner*—James M Hewitt
*Assistant Examiner*—Gwendolyn D Fournet
(74) *Attorney, Agent, or Firm*—QuickPatents, Inc.; Kevin Prince

(57) ABSTRACT

A fluid port for alternately interfacing a fluid conduit with a fluid container or with a fluid hose. The fluid container is of the type having a container wall. The port comprises a back plate having a back aperture therethrough for receiving the fluid hose therein. The back plate includes a wall attachment mechanism. A front plate is held away from and substantially parallel to the back plate by a plurality of standoffs. The front plate includes a front aperture coaxially aligned with the back aperture of the back plate. The front aperture is adapted to receive the fluid hose therein. The fluid hose may be inserted into the front aperture for substantially connecting the fluid hose to the fluid conduit. With the fluid hose removed from the front aperture the fluid conduit is connected to the fluid container through the front aperture and between each standoff.

12 Claims, 3 Drawing Sheets

POOL VACUUM PORT

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to fluid ports, and more particularly to a dual-mode pool pump port.

DISCUSSION OF RELATED ART

Numerous innovations for suction outlets have been provided in the prior art that will be described. Even though these innovations may be suitable for the specific individual purposes to which they address, however, they differ from the present invention.

A FIRST EXAMPLE, U.S. Patent Office Document No. 3,940,807, Issued on Mar. 2, 1976, to Baker et al. teaches an outlet drain designed to provide a safety environment to the users of pools, especially therapeutic or spa type pools. A series of channels extend radially outward from the central drain aperture in the pool. The suction created in the pool system draws the water through the channels and into the central drain sump. The diameter of the channels is sufficient that a person's body adjacent the drain area will not cause blockage which would otherwise create a suction on the person's body. The overall design of the pool system provides for the automatic cleaning of the bottom surface of the pool, preventing an accumulation of dirt particles adjacent the drain area.

A SECOND EXAMPLE, U.S. Patent Office Document No. 4,262,371, Issued on Apr. 21, 1981, to Berry et al. teaches an outlet for use with spa pools or the like where water and air are mixed by "Venturi Pump" to provide a water/air stream, the outlet having a direction control device for controlling the direction of the water/air stream, the "Venturi Pump being location within the direction control device.

A THIRD EXAMPLE, U.S. Patent Office Document No. 4,359,790, Issued on Nov. 23, 1982, to Chalberg teaches a suction outlet assembly providing a path through which water within a whirlpool bath may be pumped out for recirculation. The assembly comprises three principal components, namely an elbow structure which includes an integral flange and threaded pipe for protruding through a suitable orifice in the wall of the whirlpool bathtub into the interior of the tub; a locking ring having a matching threaded annular surface for securing the elbow structure against the tub wall by tightening the locking ring from the readily accessible interior side of the tube wall; and a suction cover which is designed to engage the locking ring in a fixed spaced-apart relation to provide a finished asthetically appealing appearance to the assembly while providing safe multiple exit paths to the water flowing therethrough. These three components of the present invention are of unique but simple structure which may be manufactured from molded plastic. The assembly may be readily installed in a whirlpool bathtub with only limited access to the tube exterior immediately adjacent the orifice through which the assembly protrudes. The assembly requires only a minimum fixed volume adjacent the tub exterior surface to accommodate the elbow structure of the invention.

A FOURTH EXAMPLE, U.S. Patent Office Document No. 4,596,656, Issued on Jun. 24, 1986, to Higginbotham et al. teaches a hydrotherpy return fitting composed of a fitting body with a waterflow passage through it that is connected to a water circulation pump. The return fitting is suitably held within an opening bored in the wall of the tub or spa and a removable decorative liner or cover of tubular shape is provided within the interior of the fitting. It has a circular peripherally extending flange which covers portions of the fitting in the interior of the tube. A manually removable screen is provided inside the decorative liner and a handle is provided on the screen so that it can be easily grasped. A suction relief valve communicates between the atmosphere and the passage through the water return fitting to permit air to enter when the return fitting is plugged breaking the suction and allowing the object to be removed.

A FIFTH EXAMPLE, U.S. Patent Office Document No. 5,799,339, Issued on Sep. 1, 1998, to Perry et al. teaches a safety cover for mounting upon a suction drain that removes water from a jetted tub or spa. The safely cover can handle a high fluid flow intake rate and has a relatively small size, yet is unlikely to entangle the hair of a user and can pass the industry standard five pound pull test. The safely cover has at least one internal wall that acts as a guide vane thereby advantageously tending to reduce turbulence and vortexing of the water as it passes through the cover and into the suction drain. Because turbulence and vortexing of the water is reduced, the possibility that a user's hair could extend through the cover and become entangled thereunder is likewise reduced. Further, because of the stabilized fluid flow inside the safety cover, the cover can have a size that is smaller than otherwise possible without the anti-vortexing interior wall. The interior wall also can extend from the cover to a supporting base to advantageously increase the structural strength of the cover.

A SIXTH EXAMPLE, U.S. Patent Office Document No. 5,809,587, Issued on Sep. 22, 1998, to Fleischer teaches a safety device for use in a suction outlet assembly of a swimming pool, whirlpool, spa or the like. More particularly, the outlet assembly has an opening therein in communication with a pump adapted to create sufficient suction for causing fluid flow through the outlet assembly and a cover mounted over the opening without substantially obstructing fluid flow therethrough. The safety device includes an obstructing mechanism for obstructing the opening when the cover is not properly positioned or affixed to the outlet assembly, whereby fluid flow through the outlet assembly is substantially prevented even if the pump is in operation.

It is apparent now that numerous innovations for suction outlets have been provided in the prior art that are adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a fluid port that avoids the disadvantages of the prior art.

ANOTHER OBJECT of the present invention is to provide a fluid port that is simple and inexpensive to manufacture.

STILL ANOTHER OBJECT of the present invention is to provide a fluid port that is simple to use.

BRIEFLY STATED, STILL YET ANOTHER OBJECT of the present invention is to provide a fluid port for alternately interfacing a fluid conduit with a fluid container or with a fluid hose. The fluid container is of the type having a container wall. The port comprises a back plate having a back surface, a front surface, at least one peripheral wall connecting the front surface to the back surface, and a back aperture therethrough for receiving the fluid hose therein. The back plate includes a wall attachment mechanism. A front plate is held away from and substantially parallel to the back plate by a plurality of standoffs. The front plate includes a front aperture coaxially aligned with the back aperture of the back plate. The front aperture is adapted to receive the fluid hose therein. The fluid hose may be inserted into the front aperture for substantially connecting the fluid hose to the fluid conduit. With the fluid hose removed from the front aperture the fluid conduit is connected to the fluid container through the front aperture and between each standoff.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

DESCRIPTION OF THE DRAWINGS

The Figures of the drawings are briefly described as follows.

DETAILED DESCRIPTION OF THE PREFERRED EMBODIMENT

Figure 1:
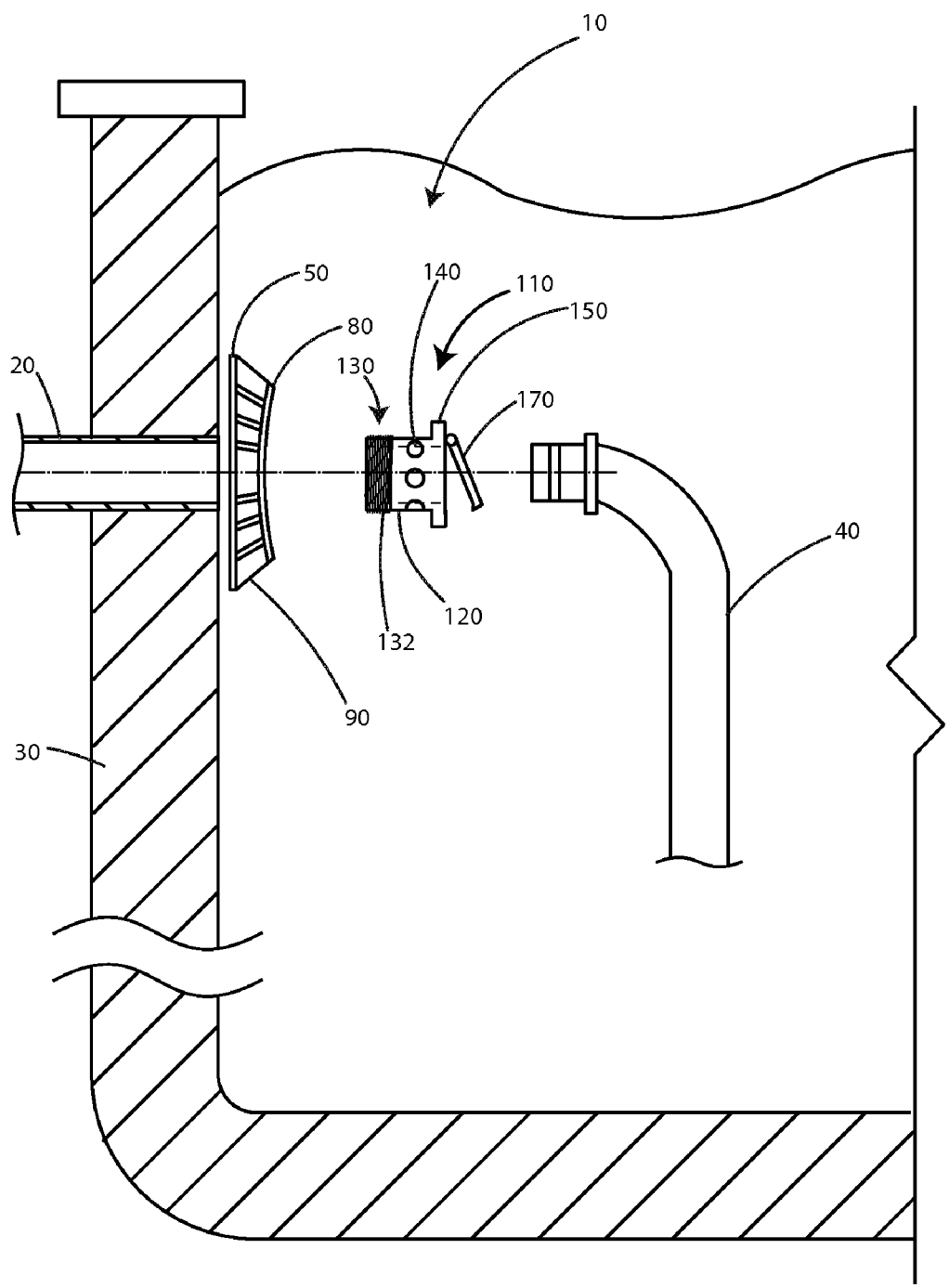
FIG. 1 is an exploded side view of the present invention with a portion of the fluid container and the fluid conduit in cross section.

Referring now to the figures, in which like numerals indicate like parts, and particularly to FIGS. 1 through 5, the present invention will be discussed with reference thereto. A fluid port 10 is provided for alternately interfacing a fluid conduit 20 with a fluid container 30 or with a fluid hose 40. The fluid container 30 is of the type having a container wall 35. The port 10 comprises a back plate 50 having a back surface 53, a front surface 54, at least one peripheral wall 52 connecting the front surface 54 to the back surface 53, and a back aperture 60 therethrough for receiving the fluid hose 40 therein and aligning with the fluid conduit 20. The back plate 50 includes a wall attachment mechanism 70. A front plate 80 is held away from and substantially parallel to the back plate 50 by a plurality of standoffs 90. The front plate 80 includes a front aperture 100 coaxially aligned with the back aperture 60 of the back plate 50. The front aperture 100 is adapted to receive the fluid hose 40 therein. The fluid hose 40 may be inserted into the front aperture 100 for substantially connecting the fluid hose 40 to the fluid conduit 20. With the fluid hose 40 removed from the front aperture 100 the fluid conduit 20 is connected to the fluid container 30 through the front aperture 100 and between each standoff 90.

Figures 4, 5:
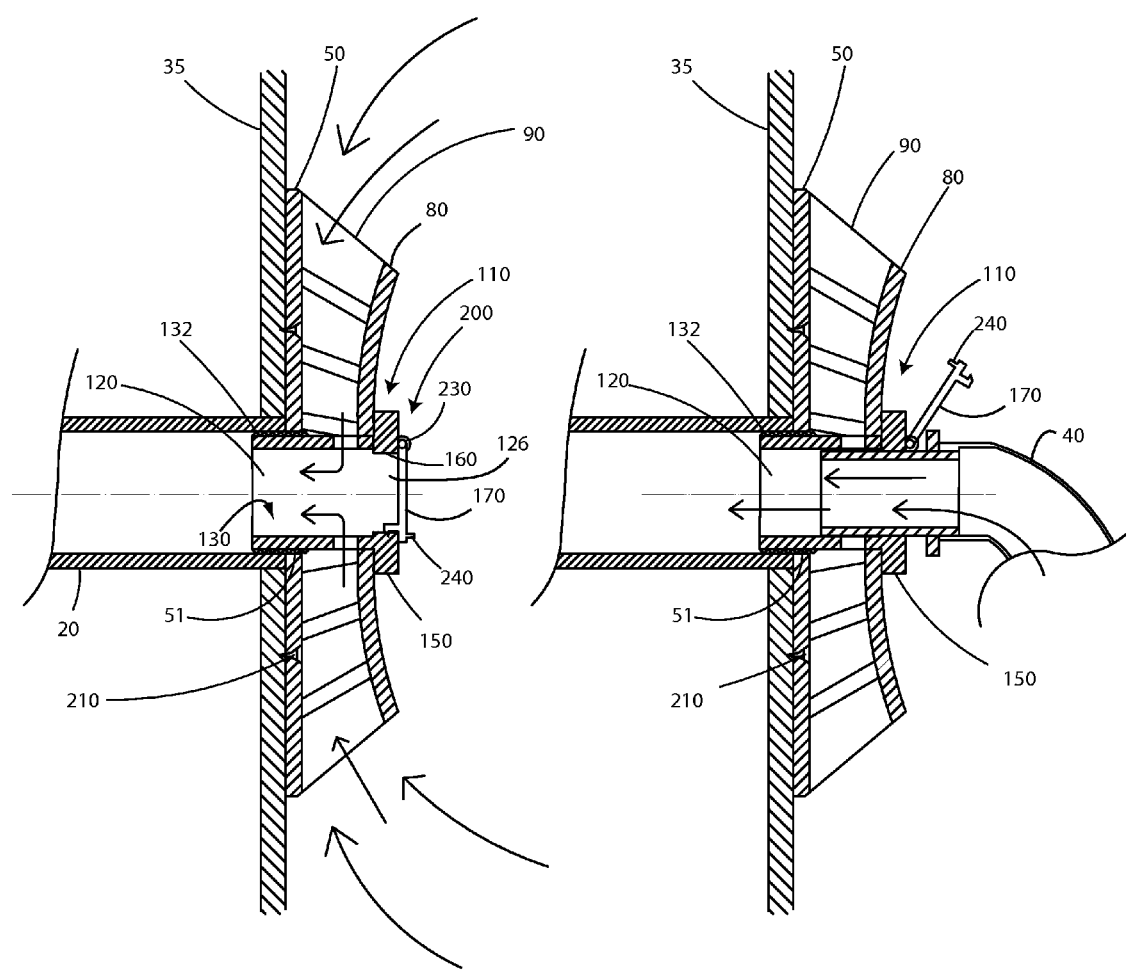
FIG. 4 is a cross-sectional view of the invention, taken along lines 4-4 of FIG. 3, and illustrating the flap in the closed position.
FIG. 5 is a cross-sectional view of the invention, taken along lines 4-4 of FIG. 3, and illustrating the flap in an open position and a fluid conduit engaged with the invention.

The fluid port 10 further includes a port cap 110 that comprises a cylindrical pipe portion 120 having a back aperture attachment mechanism 130 at a distal end 124 thereof and at least one side aperture 140. The port cap 110 includes a collar 150 fixed to a proximal end 126 of the pipe portion 120 that includes a port cap aperture 160 and a flap 170 pivotally attached to the collar 150. The flap 170 substantially covers the port cap aperture 160 when the flap 170 is in a closed position (FIG. 4). The port cap aperture 160 is substantially uncovered when the flap 170 is in an open position (FIG. 5). A biasing mechanism 200 urges the flap 170 into the closed position. With the flap 170 in the open position the fluid hose 40 may be inserted into the port cap aperture 160 for substantially connecting the fluid hose 40 directly to the fluid conduit 20 (FIG. 5). With the flap 170 in the closed position the fluid container 30 is connected to the fluid conduit 20 through the at least one side aperture 140 of the cylindrical pipe portion 120 of the port cap 110 and between the standoffs 90. The back aperture attachment mechanism 130 is a thread 132 adapted to engage a threaded portion 51 in the back aperture 60 of the back plate 50.

Figure 2:
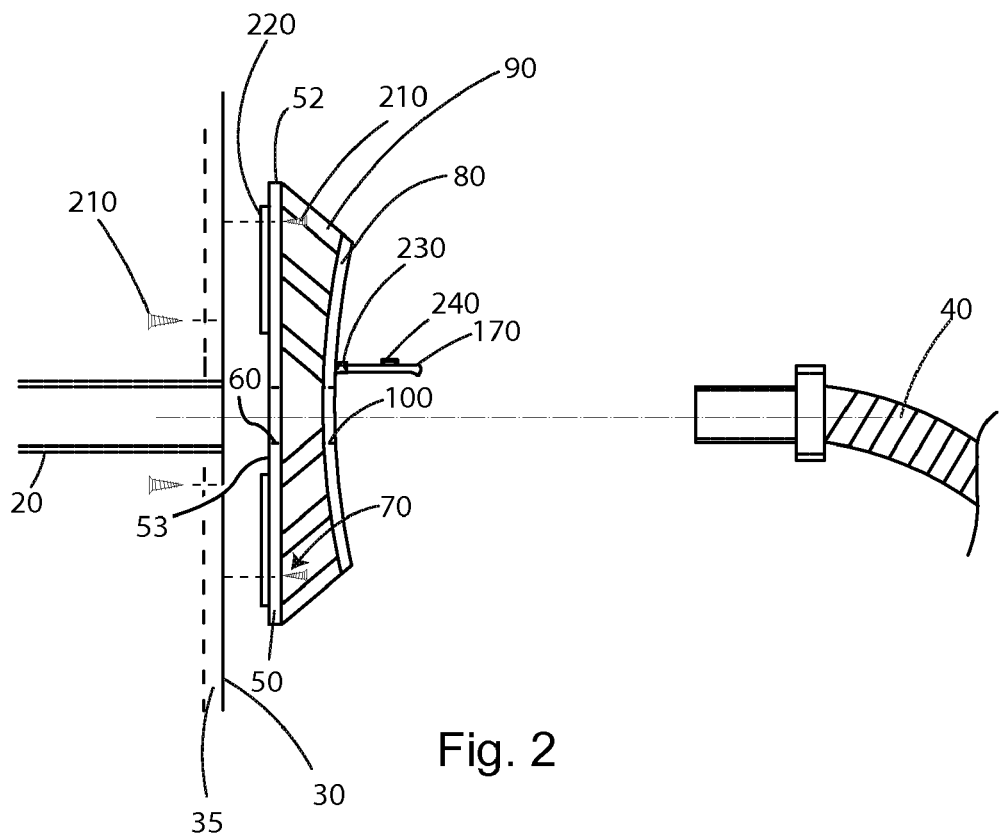
FIG. 2 is an enlarged exploded side view of the present invention.

The wall attachment mechanism 70, as seen in FIG. 2, may be at least one mechanical screw fastener 210 traversing the back plate 50 and at least a portion of the container wall 35. The wall attachment mechanism 70, as seen in FIG. 4, may be at least one mechanical screw fastener 210 traversing the container wall 35 and at least a portion of the back plate 50. The wall attachment mechanism 70, also seen in FIG. 4, may also include or alternately be an adhesive 220 for adhering the back surface 53 of the back plate 50 to the container wall 35.

The biasing mechanism 200 may be a coil spring 230, for example. The front plate 80 is fixed at least 0.25 inches away from the back plate 50 by the plurality of standoffs 90. The back plate 50 and the front plate 80 are each preferably substantially rectangular (FIG. 3), although other shapes may be used without departing from the spirit and scope of the invention. The front and back apertures 100, 60 are each preferably substantially centrally positioned within the front and back plates 80, 50 respectively.

Figure 3:
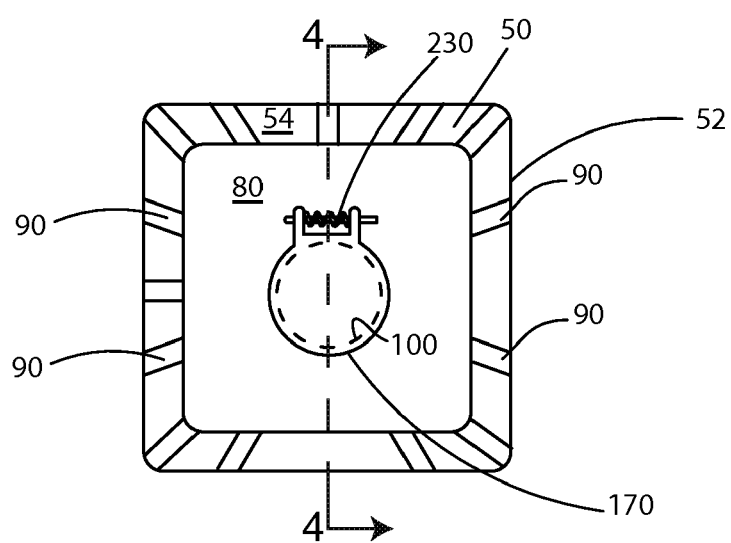
FIG. 3 is a front elevational view of the invention illustrating a flap of the invention in a closed position.

The plurality of standoffs 90 may each at least be partially curved or angled between the front plate 80 and the back plate 50 such that the front plate 80 has a smaller surface area than the back plate 50 (FIG. 3). The flap 170 may include a knob 240 projecting away therefrom for manually moving the flap 170 from the closed position to the open position. The front plate 80, back plate 50, and standoffs 90 may all integrally molded from a plastic material, such as PVC, ABS, or the like.

FIG. 2 shows an embodiment wherein the port cap 110 is not utilized. The flap 170 is directly pivotally attached to the front plate 80. The flap 170 substantially covers the front aperture 100 when the flap 170 is in the closed position. The aperture 100 is substantially uncovered when the flap 170 is in the open position. The biasing mechanism 200 urges the flap 170 into the closed position. With the flap 170 in the open position the fluid hose 40 may be inserted into the front aperture 100 for substantially connecting the fluid hose 40 to the fluid conduit 20. With the flap 170 in the closed position the fluid container 30 is connected to the fluid conduit 20 through between each standoff 90.

It will be understood that each of the elements described above, or two or more together, may also find a useful application in other types of constructions differing from the type described above. While the invention has been illustrated and described as embodiments of a fluid port, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

What is claimed is:

1. A fluid port for alternately interfacing a fluid conduit with a fluid container or with a fluid hose, the fluid container having a container wall, the port comprising:
    a back plate having a back surface, a front surface, at least one peripheral wall connecting the front surface to the back surface, and a back aperture therethrough for receiving the fluid hose therein, the back plate including a wall attachment mechanism;
    a front plate held away from and substantially parallel to the back plate by a plurality of standoffs, the front plate including a front aperture coaxially aligned with the back aperture of the back plate, the front aperture adapted to receive the fluid hose therein; and
    a port cap comprising a cylindrical pipe portion having a back aperture attachment mechanism at a distal end thereof and at least one side aperture, the port cap including a collar fixed to a proximal end of the pipe portion that includes a port cap aperture and a flap pivotally attached to the collar, the flap substantially covering the port cap aperture when the flap is in a closed position, the port cap aperture substantially uncovered when the flap is in an open position, a biasing mechanism urging the flap into the closed position;
    whereby the fluid hose may be inserted into the front aperture for substantially connecting the fluid hose to the fluid conduit, and whereby with the fluid hose removed from the front aperture the fluid conduit is connected to the fluid container through the side aperture and between each standoff;
    whereby with the flap in the open position the fluid hose may be inserted into the port cap aperture for substantially connecting the fluid hose to the fluid conduit, and with the flap in the closed position the fluid container is connected to the fluid conduit through the at least one side aperture of the cylindrical pipe portion of the port cap and between the standoffs.

2. The fluid port of claim 1 wherein the back aperture attachment mechanism is a thread adapted to engage a threaded portion in the back aperture of the back plate.

3. The fluid port of claim 1 wherein the wall attachment mechanism is at least one mechanical screw fastener traversing the back plate and at least a portion of the container wall.

4. The fluid port of claim 1 wherein the wall attachment mechanism is at least one mechanical screw fastener traversing the back plate and at least a portion of the container wall.

5. The fluid port of claim 1 wherein the wall attachment mechanism is an adhesive for adhering the back surface of the back plate to the container wall.

6. The fluid port of claim 1 wherein the biasing mechanism is a coil spring.

7. The fluid port of claim 1 wherein the front plate is fixed at least 0.25 inches away from the back plate by the plurality of standoffs.

8. The fluid port of claim 1 wherein the back plate and the front plate are each substantially rectangular and wherein the front and back apertures are each substantially centrally positioned within the front and back plates, respectively.

9. The fluid port of claim 1 wherein the plurality of standoffs are each at least partially angled between the front plate and the back plate, the front plate having a smaller surface area than the back plate.

10. The fluid port of claim 1 wherein the flap includes a knob projecting away therefrom for manually moving the flap from the closed position to the open position.

11. The fluid port of claim 1 wherein the front plate, back plate, and standoffs are all integrally molded from a plastic material.

12. The fluid port of claim 11 wherein the plastic material is PVC.

* * * * *